United States Patent [19]

Cansell et al.

[11] Patent Number: 4,945,449
[45] Date of Patent: * Jul. 31, 1990

[54] HIGH VOLTAGE CAPACITOR WITH HIGH ENERGY DENSITY

[75] Inventors: Albert Cansell; Mihail Raduleanu, both of Wissembourg, France

[73] Assignee: Atesys, Wissembourg, France

[*] Notice: The portion of the term of this patent subsequent to Apr. 1, 2003 has been disclaimed.

[21] Appl. No.: 75,615

[22] Filed: Jul. 20, 1987

Related U.S. Application Data

[63] Continuation-in-part of Ser. No. 783,199, Oct. 2, 1985, abandoned.

[30] Foreign Application Priority Data

Jul. 21, 1986 [FR] France ............... 86 10652

[51] Int. Cl.$^5$ ............... H01G 4/08; H01G 9/00
[52] U.S. Cl. ............... 361/273; 361/323
[58] Field of Search ............... 361/311–315, 361/273, 323; 336/69, 84 R; 428/245, 336

[56] References Cited

U.S. PATENT DOCUMENTS

| | | | |
|---|---|---|---|
| 2,475,592 | 7/1989 | Clark | 361/314 |
| 2,995,688 | 8/1961 | Rosenberg | 361/323 |
| 3,252,830 | 5/1966 | Cummin et al. | 29/25.42 X |
| 3,772,578 | 11/1973 | George et al. | 361/313 X |
| 4,039,714 | 8/1977 | Roubal et al. | 428/336 |
| 4,109,291 | 8/1978 | Bozzini | 361/272 |
| 4,234,648 | 11/1980 | Patz et al. | 428/245 |
| 4,480,290 | 10/1984 | Constanti et al. | 361/433 |
| 4,580,191 | 4/1986 | Cansell et al. | 361/323 |
| 4,680,617 | 7/1987 | Ross | 174/52.4 X |

FOREIGN PATENT DOCUMENTS

1589897 8/1977 Fed. Rep. of Germany .
438608 11/1935 United Kingdom .
722636 1/1955 United Kingdom .

*Primary Examiner*—Donald A. Griffin
*Attorney, Agent, or Firm*—Schwartz & Weinrieb

[57] ABSTRACT

Elementary capacitor of high energy density and high voltage, for energy accumulation, discharge, commutation or filtering purposes, comprising two conductive armatures separated by at least one dielectric layer, characterized in that each armature is associated, with at least one layer of a first dielectric, in that each armature is formed by a metallization having a resistance per surface unit of between 2 and 30 ohm, being applied on a second dielectric made of a fibrous support favoring regeneration in such a manner that the capacitor will be regenerating (self-curing), in that the capacitor is impregnated with a liquid dielectric, in that the thickness and the nature of each dielectric as well as the liquid dielectric are so selected to ensure that when the rated voltage is applied, the ratio between the prevailing electric field strength and the disruptive strength is substantially equal for each of the dielectrics. When this capacitor is charged to its rated voltage, the average electric field strength prevailing in the dielectric is comprised between about 200 V/$\mu$m and more than 400 V/$\mu$m, and the volumetric energy density is comprised between about 0.5 J/cm$^3$ and more than 2 J/cm$^3$.

23 Claims, 3 Drawing Sheets

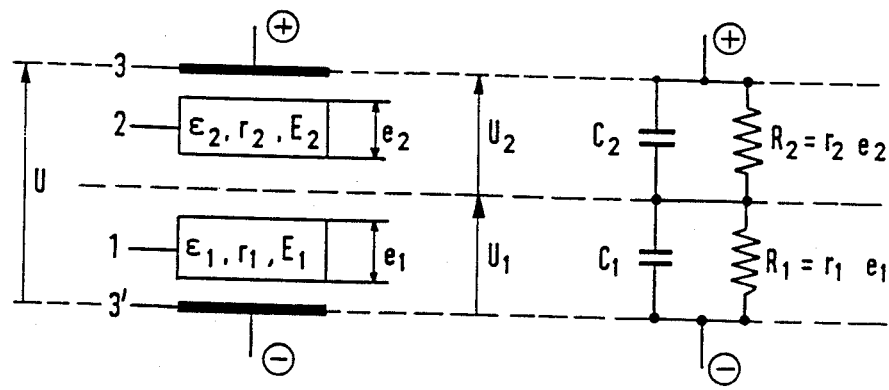
Fig. 1a  Fig. 1b
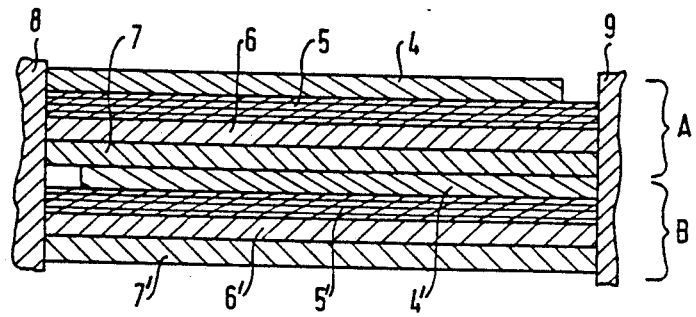
Fig. 2
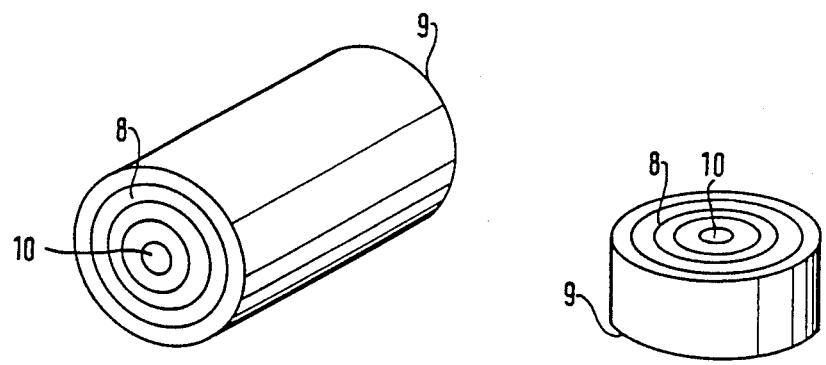
Fig. 3a  Fig. 3b

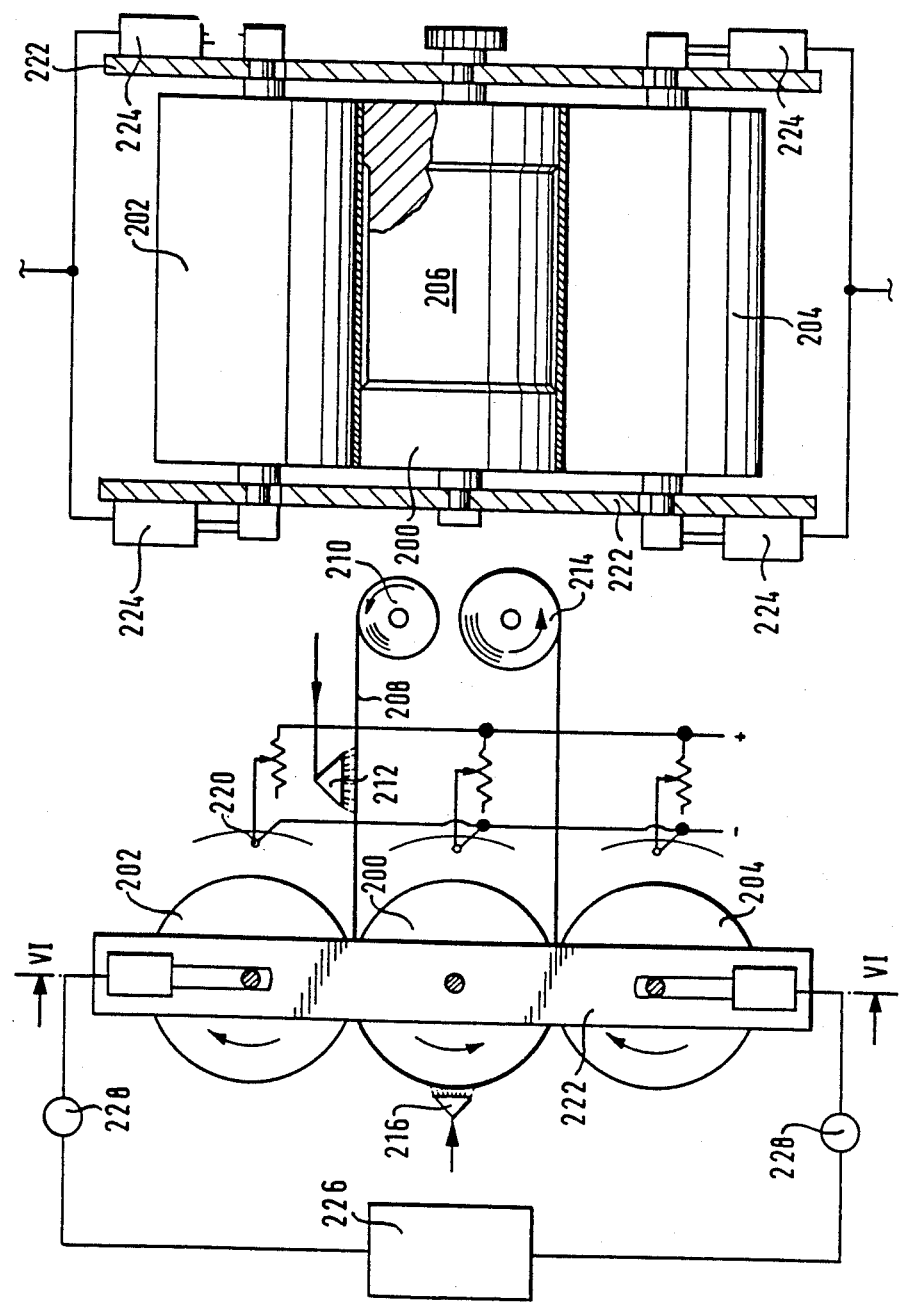

HIGH VOLTAGE CAPACITOR WITH HIGH ENERGY DENSITY

REFERENCE TO RELATED APPLICATIONS

This application is a continuation-in-part application of application Ser. No. 06/783,199 filed on 10/02/85, and now abandoned.

The present invention relates to the improvements in the subject matter described in the German patent application published under No. 3.312.076.

This application describes a capacitor type having an energy density over 0.5 J/cm$^3$ and which could even reach 1.2 J/cm$^3$, while the technology preceding this patent has shown that an energy density of 1 J/cm$^3$ had never been obtained.

The range between 0.5 and 0.8 J/cm$^3$ had already been obtained, but only with capacitors using a particular dielectric (polyvinylidene fluoride, known under the tradename "K-film"). Now these "K-film" capacitors are just able to reach this energy density level with the prejudice of so high dielectric losses that they are absolutely exluded from all applications in which the capacitor must work at a high repetition rate. The application field of those "K-film" capacitors is then essentially restricted to very low repetition rates use such as defibrillators. On the other hand, the price of this special dielectric is per Joule 3 or 4 times more expensive than the price of an usual dielectric. The type of capacitor described in the above mentioned German patent, not having the "K-film" inconveniences, is then the only one which can be considered for an energy density over 0.5 J/cm$^3$ in most cases other than the defibrillator application.

This fact has brought the applicant to improve this technology. The above mentioned capacitor was just limited to an application field similar or very closed to the defibrillator's one. The applicant has now adapted the use of this capacitor to other fields than the defibrillator, in which an energy density from 0.5 to 1.2 J/cm$^3$ was not yet obtained. Another factor to consider was the fact that the energy densities of 0.5 to 1.2 J/cm$^3$ obtained previously were only realized with some prototypes and the same values could not be reached again later on. The present invention consists therefore also in setting up the principles, which are at the basis of these energy densities, in order to be able to reproduce them reliably and even to exceed them, reaching so values higher than 2 J/cm$^3$. The new fields of the invention are those of a high voltage and high energy elementary capacitor having various applications such as energy storage, commutation and filtering applications. It belongs to the general type, including two electrically conductive armatures separated by at least one dielectric layer; the new elementary capacitor of the invention is characterized, according to the present invention, in that each armature is associated with at least one layer of a first dielectric, in that each armature is formed by a metallization having a resistance per surface unit between 2 and 30 ohms, being applied on a second dielectric having a fibrous structure, favouring regeneration, so that the capacitor becomes regenerating (self-curing) in that this capacitor is impregnated with a liquid dielectric, in that the nature and the thickness of each dielectric as well as the liquid dielectric are so selected to ensure that when the rated voltage is applied, the ratio between the electric field strength and the disruptive field strength is substantially equal for all dielectrics.

Performances which can be obtained with those means are the best resumed by two determinations:
the average electric field strength over the whole dielectric of the capacitor when this one works at its nominal voltage value: this field is from about 200 V/$\mu$m to more than 400 V/$\mu$m
the volumetric energy density of the capacitor, at this same voltage: it is from 0.5 J/cm$^3$ to more than 2 J/cm$^3$.

These two specific characteristics are the most outstanding for a capacitor of the general type above mentioned, and they are linked together.

The high electric field strength and the high energy density are obtained thanks to two main factors, linked together to get the given results, which are as follows:
1. regenerating capability (self-curing).
2. the nearly complete exploitation of the disruptive strength of both dielectrics thanks to an equal ratio between the prevailing field strength and the disruptive strength in both dielectrics.

DEFINITIONS

In this specification, the term "rated voltage" means the maximum working voltage the capacitor may handle. It corresponds to a working voltage for a normal use, i.e. with a sufficient safety margin, but within applications where some restraints, other than voltage itself, are low or medium. These restraints are for instance the repetition rate if the capacitor is used on discharge, the temperature or other parameters. If some of these parameters are high, the capacitor will work on a derating mode, with a voltage less than the rated voltage.

1. REGENERATING CAPABILITY

This regenerating capability consists in the property to "cure" an insulation failure, when it happens, by burning out the metallization around the failure zone. It is possible then, to use the whole disruptive strength of the dielectric placed between the two armatures, until a very high degree, because of the elimination of occuring failures.

This property allows consequently to approach the insulation limit of the whole dielectrics, whatever the insulation limit level may be. It is the part of the second dielectric and of the metallization characteristics to assume this regeneration faculty. In fact, the regeneration process has been known for many decades, but has never been used in the conditions of the present invention, so could never conduct to the same results. This process has, particularly, never been used at the same time to such voltage, energy and electric field levels as allowed by the invention, because at some of these different levels, the process could not be checked, and brought to capacitor failure.

This problem is perfectly described in the French patent No. 7908375 in the following terms.

> "It is known that during the controls at the end of the manufacturing or while using such capacitors, the dielectric failures lead to local discharges in the form of arcs, oxidizing or volatilizing locally the metallized armature. These discharges are useful as they restore the normal insulation. This process is called self healing.
> Nevertheless, with capacitors of a certain capacitance and voltages higher than some thousands of volts, the energy available can at least locally be destroyed. As the energy kept in a capacitor is proportional to the voltage square, the above mentioned risk becomes greater, a fact which increases the destruction risk danger of high voltage capacitors."

The solution to this problem proposed by French patent No. 7908375, is to divide the metallized armature into several isolated parts obtained with a laser beam, in order to decrease the energy which appears during a self curing.

The voltage, electric field and energy values obtained in this way and cited are 1500 V, 187 V/μm (1500 V:8 μm) and 112J.

But the solution proposed in this patent presents the following inconveniences:

Complexity to remove metallization with laser beam, consequently loss of capacitance, and also loss of capacitance during operating time when one or several metallized teeth are separated.

On the other hand, the levels of voltage, electric field and energy obtained in this patent are much more lower than those of the present invention the values of which are respectively 600 V to at least 8000 V, 200 V μm and more than 400 V/μm until 500J or more, for an elementary capacitor.

The given solution of the present patent conducts to much more interesting results, though using more simple means which are a metallization having a surface resistance of between 2 and 30 Ohms settled on the second dielectric consisting in a impregnated fiber structure.

In other terms, this specificity bound to other elements of the present invention is the base of a perfect skilled mastership of self-curing phenomenon, and this even for the extreme values of voltage, field or energy given previously.

This mastership can be obviously settled with the following statements: when a capacitor corresponding to the invention is brought to regenerate, because of a certain working time, or because the rated voltage is exceeded, the dissipated energy at the point of the self-curing is always a very little part of the total energy of the capacitor, for instance 1%. So, a capacitor according to the invention, for a charging process to 5000 V, will see a voltage drop to about 4980V as a result of such a self-curing. The little voltage drop and energy drop of such a self-curing is due to the fact that the current running to the point of the puncture is nearly stopped by the surface resistance of the metallized layer which is relatively high. The thickness of the metallized layer being very small, the mass of metal to be burnt, will be small. A particular characteristic of the capacitor according to the invention, is that the voltage needs not to drop in order to stop the current of the self-curing. The current stops itself due to the surface resistance and to the very low thickness of the layer.

A perfect demonstration of the regenerating property of a capacitor in accordance with the invention is given in the following experience:

In a winding capacitor according to the invention, a needle is punched at a depth of 1 mm perpendicularly to its axle, then removed. Then the capacitor is loaded. At the first charge, some small cracklings will appear (if the winding is not protected by oil), and afterwards the insulation will be definitly reestablished.

2. UTILIZATION OF THE TWO DIELECTRICS AT THE SAME RATIO

This second feature of the invention is linked with the regenerating property, as whereas this later allows to reach the insulation limit, this second feature allows to increase this limit up to never obtained values.

The selection of the different parameters of both dielectrics, so that the ratio between the prevailing field strength in each dielectric and the resistance to disruptive discharges is substantially equal for all dielectrics, leads to work at the same level with both dielectrics, 80% for instance.

With this process, the entire dielectric will better be used and an average electric field is reached of a level never obtained before.

The average electric field values obtained are from 200 V/μm to more than 400 V/μm. It is easy to demonstrate that the volumetric energy density d for a winded capacitor is:

$$d = \frac{\epsilon 0\, \epsilon r}{2} E^2$$

$\epsilon 0$: absolute permittivity of the vacuum
$\epsilon r$: dielectric relative permittivity
E: electric field in the dielectric d being proportional to $E^2$, it is clear that the present invention allows to reach an electric field which is more than twice the one corresponding to the actual state of the art (300 to more than 400 V/μm compared to 150 V/μm), and, consequently the density of energy stored in the capacitors, more than four times higher.

A preferred embodiment of the invention is to obtain that the two dielectric films work equally consists in choosing the nature of those two dielectrics and also the liquid dielectric which impregnates them that for every impregnated dielectric the ratio between their resistance and their maximum electric field is practically equal. The constant value of this ratio must be also confirmed at the high levels of electric field encompassed in the present invention. It is obviously admitted that impregnation conditions (temperature, vacuum conditions, treatment duration) allow to act on these parameters. Not only, to act on the most favourable partitions of electric fields in a composite dielectric, is not already known, but is inconsistent with usually admitted electric rules. In the case of a composite dielectric, the electric field level in each of the two dielectrics depends on several dielectric parameters.

Considering FIG. 1a of the attached drawings, the two dielectrics 1 and 2 have the same surface, thicknesses e1 and e2, relative dielectric constants $\epsilon 1$ and $\epsilon 2$, and resistivities r1 and r2; if the capacitor is charged to a voltage, value U, it appears in each of the two dielectrics electric fields E1 and E2, and consequently, in every dielectric the following voltages appear according to the relations:

$$U1 = E1 e1$$

and $$U2 = E2 e2$$

The present state of the art gives for composite dielectrics the relation:

$$\frac{U2}{U1} = \frac{\epsilon1 \; e2}{\epsilon2 \; e1} \quad (1)$$

This relation is only true for a theoretical capacitor which has no leakage resistance. Such leakage resistances $R_1$ and $R_2$ are seen on FIG. 1b in parallel on capacitors $C_1$ and $C_2$ which symbolize the two dielectrics 1 and 2. In most practical applications, the relation (1) is true because $R_1$ and $R_2$ can be considered as infinite. If capacitors $C_1$ and $C_2$ are considered connected in series and without leakage resistances, it can be said:

$$\frac{U2}{U1} = \frac{C1}{C2} \quad (2)$$

The hypothesis that $R_1$ and $R_2$ are considered as infinite is justified in pratically all the applications of the present state of the art, because all the known capacitors are working under a "low" electric field (inferior to 200 V/$\mu$m). In these conditions, the dielectric resistivity can be translated into a conventional manner in Ohm$\times$m but also in M Ohm$\times\mu$F. This value which is given in the literature for a field of only a few V/$\mu$m, corresponds to a time constant of 50,000 seconds (14 hours). As the charging time of a capacitor is always obviously inferior to that time, the insulation resistance will not have enough time to change the partition of voltages as expressed in relations (1) and (2).

Now, according to the present invention conditions, which consist more particularly in getting the values of electric field as near as possible of the maximum value authorised by the two dielectrics i.e. their disruptive strength, the resistivities of the dielectrics are only a part of those given in the literature and then, the insulation resistances $R_1$ and $R_2$ with also time constant $R_1 C_1$ and $R_2 C_2$ become low enough to give a partition of voltages according to the relation:

$$\frac{U2}{U1} = \frac{R2}{R1} \quad (3)$$

or $$\frac{U1}{R1} = \frac{U2}{R2} \quad (4)$$

In the case when $U_1$ and $U_2$ have reached their maximum value, very near from disruptive strength, then:

$$\frac{U1 \; max}{R1} = \frac{U2 \; max}{R2} \quad (5)$$

If the maximum value of the dielectric field of both dielectrics E1 max and E2 max (disruptive strength), their respective resistivities r1 and r2 and their thicknesses are introduced into (5), then:

$$\frac{E1 \; max \; e1}{r1 \; e1} = \frac{E2 \; max \; e2}{r2 \; e2} \quad (6)$$

or $$\frac{E1 \; max}{r1} = \frac{E2 \; max}{r2} \quad (7)$$

This relation is expressing a preferred choice of dielectrics and also of the impregnation conditions according to the present invention.

Nevertheless it is worthy to observe that the relation (7) is purely theoretical. In fact, in the practice it is advisable to use the relations (3) or (4) which use the total insulation resistance of the given layer thickness rather than its resistivity, as to establish the relations (6) and (7) one has put the hypothesises $R_1 = r_1 e_1$ and $R_2 = r_2 e_2$, while our experience has shown that these hypothesises are not verified for films with thin dielectrics subjected to high field strengths. We have observed that for such films the resistance is not a linear function of the thickness, that means the resistivity is not constant. For instance for polyester films of 3 to 5 $\mu$m the resistivity is much less compared to thicknesses of 8–12 $\mu$m (always subjected to high field strength). So the choice of the dielectrics must satisfy to the relation (4) and must take into account the thickness of given dielectrics. Let's consider an assembly of two dielectrics (FIG. 1a) in which one (1) is solid and made of an homogeneous plastic, the second (2) which is porous and fibrous, and the whole assembly impregnated with an isolating oil. If we study these dielectrics concerning the resistivity one may admit, as a first approximation, that the second dielectric (2) does behave as an oil reservoir and has a large part of this oil characteristics, while dielectric 1, which is solid, has essentially the characteristics of its material. According to the usual knowledge of the technology, if such a solid dielectric is used alone or combined to other, and if it is impregnated with oil, one admits that this oil only serves to reinforce the weak points of the dielectric and the disruptive strength at these points. One expects also a reduction of the "corona effects" especially at the edges.

Concerning the resistivity of a solid dielectric, one always considered that this characteristic belongs only to the material it self. However within the results of the present invention and especially for the high field strengths which are supposed to be applied, the dielectric 1 has a resistivity which is not constant, but is first proportional to the chosen film thickness and second, for a given thickness, this resistivity (or the resistance if considering this particular thickness) is a decreasing function of the electric field. Finally, this resistivity is not any more exclusively tied to the material, but strongly dependent from the oil which impregnates it. This discovery has occured by chance: we have built a first capacitor according to the invention which had an energy density of 1.3 J/cm$^3$ obtained perfectly reliable and reproductible. This capacitor was impregnated with silicone oil.

As a second capacitor we built another one, exactly identical to the previous one, but impregnated with castor oil. Only 75% of the previous voltage could be reached then, meaning 56% of energy density. However, the disruptive field strength of castor oil is approximately the same as for silicone oil. Calculating the energy contained in each of the dielectrics, we found that the energy contained in the dielectric 1 represented 85% of the total energy. The energy deficit of the second capacitor had consequently to come from the dielectric 1, at least for a large part, since this capacitor had lost 44% of its total energy.

The energy deficit of the second capacitor could not, as a consequence, only come from the dielectric 2, whether for resistance or resistivity reasons, nor for oil nature reasons.

Since the oil disruptive strength of the second capacitor was as good as for the first one, the energy deficit of the dielectric 1 could not have as origin the disruptive strength but only a modification of resistance variation and a bad voltage distribution with regard to the disruptive strength as teached by the invention.

So we had to conclude that the oil type has its importance regarding the resistance and the resistivity of the dielectric 1, notion which is, to our knowledge, not currently accepted for solid dielectrics. As the proof is produced, we have done the following explanation. The probable reason is that the films made of thin plastic have a certain among of microholes. The amount of these holes per surface unit is inversely proportional to the thickness. Over a certain thickness, the films are certainly "tight". These microholes are small enough to avoid the puncture through of the dielectric. They are distinct first from the film "craters" which are cavities with variable depth on the dielectric, but are larger and cause puncture at a certain applied voltage and second from microcavities which are enclosed in the dielectric and do not necessarily communicate. These microholes, more or less filled up by the impregnation oil, are numerous enough for a thin film, so their presence in parallel and under high field strength leads to a current through the oil which fills them up, due to ionization phenomena, impurity or residual moisture contained in the oil. This current leads to a virtual drop of the insulation resistance of the film. This phenomenon comes in addition to the polarization and ionization currents of the materiel itself and risks to be confounded with these. But in our conditions, a current by microholes is certain. The proof is that, if we change the type of oil and/or the related impregnation conditions and while measuring the leakage current (at high field) of the capacitors, we found resistance variations such that they could only be originated by conduction through mechanical passings filled up with oil of the dielectric 1. If the plastic film had be tight, the oil would not have such an influence.

Considering the example of the second capacitor described above, the energy deficit is therefore due to a resistance drop of $R_1$ (FIG. 1a) such as the field within the dielectric 1 has decreased very much as a consequence of the influence of the relation (3). The field of dielectric 2 happened to increase all the higher and had reached its voltage limit much earlier compared to dielectric 1. The excessive drop of $R_1$ on this second capacitor has been confirmed by auto discharge measurements. These measurements show the total leakage resistance ($R_1+R_2$) of the capacitor, in which $R_1$ is included for a large part. One may also verify that the auto discharge concerns an energy portion which can only come from the dielectric 1. The described experience shows that the energy density of the first capacitor is based on relations of resistances provided by the invention, which have been deteriorated by changing the impregnant on the second capacitor. However, it is possible that a castor oil of different nature or which sustained another treatment, may satisfy to the invention purpose. Oils of other types, mineral or organic, may also be considered.

A remarkable feature of the capacitors according to the invention, is the fact that the voltage distribution process of both dielectrics with regard to the insulation resistances (or leakage) does only start on a relativ high electric field strength, precisely when this distribution is useful.

When the insulation resistance drops for one or the other dielectric simultaneously and proportionally as the electric field approaches significaly the maximum field (e.g. 70–80%), it is not sure that this insulation resistance reduction does follow with the same ratio for each dielectric. In certain applications of the invention, the disruptive strength or electric field limit of each of the dielectrics, is exploited for nearly 80%. The fact that we only have a few self-healing punctures in this dielectric shows that the insulation resistances under this high electric field strengths are reduced in proportions which are, in any case, favourable for a good electric field distribution over both dielectrics. The insulation resistance at high electric field strengths begins already to decrease while the capacitor charges. When the electric strength field in one of the dielectrics approaches the disruptive field strength, then the insulation resistance of this dielectric decreases automatically, its electric field and its voltage grow less fast while the field and the voltage of the other dielectric will grow faster. One understands this phenomenon if we consider the equivalent diagram described above (FIG. 1b). So during a charging process the insulation resistance variation in relation to the field has as consequence that in each dielectric the ratio between the effective electric field strength and electric field limit stays perceptibly unchanged, and so guarantees the conditions which are the invention purpose. The more the electric field approaches the field limit, the more the insulation resistance decreases.

This auto-regulation of course does only work within a specific range. If for a given dielectric its field limit is reached while the capacitor has only reached a fraction of the expected maximum voltage, then the capacitor will be unable to handle this voltage. The remedy in this case will consist in a better choice of the insulation resistances $R_1 R_2$. The insulation resistance drop at high electric field strength has been evidenced with the help of the measure arrangement as follows: one has realized a capacitor corresponding to the invention composed of a metallized paper layer and of two polyester layers (for each armature), and of a liquid dielectric consisting of silicone oil. This capacitor has a capacitance of about 20 $\mu F$. We connected between the terminals of this capacitor an external resistance of 1 Gigaohm (Gohm). The capacitor has been charged with a DC voltage of 4280V and the voltage decrease has been recorded in function of the time. The discharge curve did show only small deviations compared to the theoretical discharge curve of a perfect capacitor (with no leakage) discharging into an 1 Gohm resistance. We deduced that the internal resistance ($R_1+R_2$) of this capacitor at 4280V is much higher than 1 Gohm: about several 100 Gohm. Afterwards, the same capacitor has been charged up to 6000V, which is its nominal voltage: already-after 38 minutes, the voltage had dropped to 5000V. If we consider this voltage drop as the result of a constant insulation resistance in parallel with the 1 Gohm resistance but built into the capacitor ($R_1+R_2$), it has a value of 1,55 Gohm. Analyzing the decay of the discharge curve in the immediate neighborhood where the charge ends, we found that the decay is much lower compared to a natural exponential and one have thereafter deducted an instant time constant lower as 1 second at this particular time of the curve. This lower time constant influences already the end of the charging process and modifies already favourably the field strengths within the dielectrics before charging is achieved. From the beginning of the discharge curve on, the time constant, which is then very low, starts to grow and reaches, after a while and/or below the value it has at the curve end which is a natural exponential. This growing is so fast that the capacitor attains very soon a high insulation resistance. As soon as the equilibration of the voltages $U_1$ and $U_2$ according to the invention is achieved, the leakage becomes very weak. The insulation resistance and time constant, which are very reduced at the discharge curve beginning, show the decrease of at least one of the two insulation resistances connected in series ($R_1$, $R_2$).

The strong decrease of the insulation resistance when approaching the field strength limit has also the following advantage for the capacitor life time: If we suppose that the described capacitor is charged for the first time up to 6000V, each capacitor element $C_1$, $C_2$ corresponding to each dielectric 1 and 2 (FIG. 1b), should store the same charge if the auto discharge within the insulation resistances would be inexistant. The auto discharge which usually is different for both dielectrics, brings one of the two elements $C_1$ or $C_2$ to have, after a while, a charge less important that the other one. Now, if we discharge exteriorly the capacitor, the elements will not be completely discharged due to the initial different charges before the discharging process: the one which did not have internal charge losses, will remain partially charged with the original polarity, while the other one will be charged with the inverted polarity. The remaining voltages at the capacitor elements $C_1$ and $C_2$ are low enough to consider the insulation resistance as infinite. The elements $C_1$, $C_2$ may then keep their charge for a long time, meaning a few weeks or months. If we now load the capacitor, the charging current has first to discharge completely the capacitor element with opposite polarity and then to charge it in the polarity given by the charging current. If one loads now the capacitor with a given charge, this capacitor element will take a smaller charge compared to the other one and will therefore get a lower voltage than previously, and will be less stressed during its following chargings.

This effect, which is theoretical and cannot be measured, has been evidenced by experimentation, not with the separated dielectrics which compose the capacitor (because one cannot apply the field strengths to the separated dielectrics on a suffisant surface without permanent punctures), but with two complete capacitors (capacitor wounds) of different capacitance values. Two capacitors, connected in series, have behaved in the same manner than the individual dielectrics of one capacitor as indicated above. Of course, this happens only if one applies a voltage high enough that one of the capacitors reaches its field limit and has a lot of losses or self-curings. After a discharge and a permanent short circuit of the series connection, one has measured that both capacitors remained charged with opposite polarities of about 10% of the end-charge voltage. This effect, which has been observed on a real capacitor, shows to be an advantage when one connects such capacitors in series because an irregular voltage disbribution due to different capacitance values must be expected. A temporary difference between the voltage may also occur during the loading process.

Such defaults by a bad voltage distribution do not affect capacitors, according to the present invention, when they are connected in series, first because the capacitors are not destroyed due to the self-curing capability when reaching the limit of the mean field strength (or the field strength limit of one of the dielectrics), and second, because after the discharge, one is in presence of a charge with opposite polarity which protects one capacitor against an overcharge during another charge process.

The elementary capacitor, according to the invention, thus is particularly suitable for a series connection of a large among of elements, and constitutes a preferential application on which we will come back later.

The principles described herein have been verified systematically for elementary capacitors having voltages between 2 KV and 20 KV, taking as first dielectric ethylen polyterephtalate and as second dielectric, metallized paper. One have observed that the energy density obtainable for the entire voltage range was not constant. The energy density given for utilization conditions of medium severity had a value superior to 1 $J/cm^3$ for a voltage of about 5 to 8 KV (example: capacitor of 7 KV obtained with paper of 7 $\mu m$ thickness with a metallization of 5 to 10 ohm per surface unit and ethylen polyterephtalate of 14 $\mu m$ thickness (2 layers of 7 $\mu m$), all impregnated with silicone oil, the mean electric field strength being of 333 V/$\mu m$; energy density 1.6 $J/cm^3$).

For the elementary capacitors between about 5 KV and 2 KV or between about 8 KV and 20 KV, the reachable energy density decreased progressively from 1 $J/cm^3$ down to values inferior or equal to 0.5 $J/cm^3$. The causes of this drop were of totaly different nature and led us to do other improvements or take other arrangements.

Between 5 KV and 2 KV

The energy density reduction was due to a technological limit for one of the used dielectrics.

Let's take the case of a capacitor supposed to have a nominal voltage of 3 KV. To get an energy density of 1 $J/cm^3$, one should work with an electric field strength of 300 V/$\mu m$ (result of previous experimentations). So the thickness of the dielectric should be of $3000/300 = 10$ $\mu m$. Now, it is intuitive that to hold the same average field, one must have nearly the same thicknesses distribution taking the same dielectrics. For the previous case of this 7 KV capacitor, the thickness ratio between the paper and the total dielectric was of 6/20, means 30%. Applying this rule to the foreseen 3 KV capacitor we should have paper and ethylen polyterephtalate respectively of 3 $\mu m$ and 7 $\mu m$. But paper with thicknesses below 6 $\mu m$ is not commercially available. So we have been forced to use the existing paper of 6 $\mu m$ and to associate an ethylen polyterephtalate of 4 $\mu m$ with it. The unfavourable distribution of the dielectrics has consequently led to a capacitor which instead of 3 KV, hold only 2 KV, and has reached only an energy density of 0.43 $J/cm^3$. This energy density was still acceptable compared with the state of the art, but the applicant has developed a paper with a thickness less than 6 $\mu m$ in order to enable us to reach the foreseen values.

A first technique to realize paper of thickness below 6 $\mu m$ consists in taking the existing 6 $\mu m$ paper and to reduce its thickness by pressing or by calendering. The thickness one may so obtain is of about 4 $\mu m$ which permits already to increase the energy density of capacitors having a dielectric of 8 to 12 $\mu m$ total thickness (paper ratio $\frac{1}{3}$ to $\frac{1}{2}$).

According to a preferential technique of the invention, we execute a pressing by exposing the paper to a relative humidity of 20% to 40% and a temperature of 60° C. to 120° C. It will be advantageous to do the pressing by using rollers between which is passing the existing paper of 6 to 12 μm as starting matter. Instead of damping the paper with water or more particularly water steam, we can also damp it with a varnish which fastens the paper structure after the pressing or with a chemical product, and especially a product which softens the fibers. We also can use several methods at once. By reason of the non-negligible gap of the rollers bearings, it is difficult to adjust a very thin slot between the two rollers (e.g. 4 μm) as it would be necessary to get the desired thickness of paper. To solve this problem, the invention points as a target, at least two cylindric rollers being in close contact, one of them being driven, and rotating in opposite directions. The circumference of one of these rollers has a rectangular cut out which width is at least equal to the paper width and deepness is lower than the thickness of the starting matter paper. This allows a close contact of the two rollers beyond the cut out and the required thickness of the slot is insured in the region of the cut out. The pressing or laminating method must take some time so that the shape of the natural cellulose fibers constituting the paper can be modified by a kind of creeping or flowing.

An invention variant based on the same principle consists in damping one paper side of a regular capacitor for instance 6 μ thick with a solvent or a cellulose "plasticizer" and then to press the paper. The used solvent quantity will be so that at least one part of the capacitor paper structure remains intact. Carbon disulphide ($CS_2$) can be used as "plasticizer". According to the invention, another technique for obtaining this paper is based on destroying the membrane of natural fibers of cellulose, so that thinner and more dense cellulose fibrils than the constituting fibers are obtained. The paper pulp used for manufacturing the normal paper contains already 10 to 20% of such cellulose fibrils. These fibrils can be extracted from the paper pulp eventually diluted with water by deposit under the effect of natural gravitation force or by centrifuging. Thicker cellulose fibers deposit easier than thin fibrils.

If we make capacitor paper from these fibrils as foreseen in a preferred embodiment, this paper can be made with a thickness lower than with fibers because of the extremely thin resulting coating and this despite a sufficient mutual mechanical linking of the fibrils, looking like a fleece. Besides, these flat fibrils have the advantage of a 50% higher density and a corresponding lower porousness, which results in a higher disruptive strength.

Cellulose fibers of conifer have a diameter between 3 and 6 μm and a length of about 200 μm even though the corresponding fibrils have a diameter of about 0.2 to 0.4 μm and a length of about 3 to 4 μm. On the other hand, the microfibrils, less interesting, have a much smaller diameter of about 0.06 μm to 0.08 μm. It will be possible to obtain much more quantities of cellulose fibrils by treating them cellulose fibers using ultrasounds. The preferred ultrasonic frequency should be included in the range between 400 KHz and 600 KHz. The membrane of the cellulose fibers can also be destroyed by chemical products to obtain the fibrils. This can be accomplished by a hypochlorite solution which, by releasing chlorine, destroys the membrane.

Independently with the applicant's primary motivation which was to obtain a reduced paper thickness allowing to observe an optimal dividing up with regard to the associated dielectric (polyethylen terephthalate), this operation has other advantageous effects: the above described capacitor papers are much thinner than the regular paper. Considering that they are obtained from a higher thickness or smaller fibers, they have a higher density and consequently the advantage to have less microcavities than regular paper, which results a higher disruptive strengths than those of the usual papers.

According to the invention, using such papers makes the capacitor smaller first because the reduced thickness of the paper results in a higher capacitance, and second, because its higher density and higher disruptive strength allows to increase the capacitor voltage and consequently the accumulated energy compared with usual capacitors.

Another advantage of this new paper is its aptitude to an optimal metallization. Metallization of usual papers has often nibs that penetrate deeply into the paper porosities in spite of the varnish coat.

These nibs originate punctures. The new paper having less porosities, it will be less exposed to this penetration. The metallization method has been improved too. The usual method consists in evaporating metal, zinc for instance, essentially under a right angle on a paper tape. A new method for metallization of capacitor paper proposed by the actual invention foresees to deposit the metal with an acute angle lower than 75°, preferably with an angle between 10° and 45°, the optimum being an angle between 25° and 45°. It is preferable that the metallic particles trajectory has an orientation with a component in the direction of the movement of the paper; but other trajectory orientations of the metallic particles are possible. The mentioned embodiment has the advantage that the particles can't penetrate deeply into eventual porosities of the paper tape because they hit the paper under an oblique direction. It is essentially on the raised paper parts that the metal is deposited. As a result, one increases the paper disruptive strength and consequently will have a capacitor usable for a higher voltage. The above described metallization device of capacitor paper is characterized by a trajectory of the metallic particles having an acute incident angle to the paper.

This new paper with a thickness of 2.5 to 6 μm will allow, according to the invention, an advantageous realization of capacitors between 2 and 10 KV. With the smallest paper version or with particular impregnation conditions, we can even envisage models between 600V and 2 KV.

Between 8 KV and 20 KV

The progressive lowering of energy density observed on models between 8 KV and 20 KV had another cause commonly called edge effect. Some authors have shown that the edge of the metallic coating constituting the armature creates at this area in the dielectric a higher electric field strength than in the rest of the coating, which involves arcings at this place at a much lower voltage than in other regions. These arcings, in our case, are not destructive since they are self-curing, but nevertheless they limit strongly the rated voltage of the capacitor. Different works have shown that the relation between the edge field and the homogeneous dielectric field is a function of the square root of the dielectric thickness. This relation has been experimentally verified too. That makes that the capacitors, according to the actual invention, have on principle an edge effect which appears at a much higher voltage than for known capacitors, since for a given voltage, we work at more than twice the electric field with one half of the thickness. According to the invention these capacitors allow by principle to rise twice their voltage compared to known capacitors before reaching the level where the edge effect is appearing.

Due to this fact and in anticipation of the series connection of capacitor batteries, we have set the optimum voltage of our elementary capacitors to a value of about 5 to 8 KV to profit by our maximum energy density for the whole battery. It is certain that we don't exclude producing elementary capacitors of 8 to 20 KV, based on the invention principle, either with an energy density lower than 1 J/cm$^3$ or with a higher energy density if we associate with the invention a supplementary improvement.

Such an improvement consists in particular, for the case when the dielectric 2 is made of several layers, to insert between 2 such layers, one layer of dielectric 1 but not metallized. For instance, one may have for each armature the following structure: dielectric 2 (metallized)—dielectric 1—dielectric 2 (non metallized)—dielectric 1. The electric field strengths distribution in function of the disruptive field strengths will behave the same way for a dielectric 2 metallized or not, and for any arrangements of the different layers.

One can also notice that the principle of maximum exploitation of a dual dielectric, according to the present invention, may also be applied in cases of a non-self-curing capacitor with thick armatures (aluminium layer) instead of metallized armatures. An advantageous application of the capacitor according to the invention is the constitution of series batteries and series-parallel ones. As indicated above, such elementary capacitors will have, for instance, voltages of 5 to 8 KV if a maximum of energy density is expected. The diameter of the elementary wounds can vary between 10 and 100 mm and the height between 20 and 100 mm. A very valuable figure is for instance a wound of 50 mm diameter and a height of 80 mm. However, for a large part of the intended applications, the capacitor has to deliver during the discharge process very important currents. Now, according to certain literature (for instance the journal "Electronique de puissance" Nb. 1, addition to the Nb. 724 of "Electronique Actualité" dated Sept. 9, 1983, page 69), the capacitors with metallized armatures are, as a principle, excluded for very high currents (500 A to 50 000 A for an elementary capacitor). Within the present invention on the other hand, we have been surprised to see that, in certain cases, it was possible to deliver repeatedly currents of about 10,000A without damage, using capacitors according to the invention. This is very surprising if one considers the high resistance per surface unit (for instance 7.5 ohm) of the armatures. To explain this fact, we have done the following remark: a capacitor is composed of bands which have an unwinded length L and a width h (which corresponds to the height of the wound). One can also consider the winded capacitor as an unwinded one composed of an among L/h of squares connected in series, but also connected in parallel at the level of the "schooping" (winding slice side metallization). So the internal resistance is inversely proportional to this ratio L/h for a given film resistance. Now, since in the capacitors, according to the invention, the dielectric thickness, for a given voltage is very low compared to the known capacitors (factor less than ½), the length L will therefore be more than twice for a given section of winding, compared to known capacitors. That is the reason why the capacitor, according to the invention, has particularly high L/h ratios for the range of the planed voltages (500 V to 10 000 V), allows peak currents of 5000 A–100 000 A for an elementary capacitor, and presents very low inductances. The highest L/h ratios and, as a consequence, the highest currents, are obtained on low height shaped capacitor with a large winding diameter (for instance 70 mm diameter and 25 mm high).

These high currents are all the more surprising as the used metallization is very thin (for example 7.5 ohm per surface unit). This result reposes on the capacitor principle itself and on its geometry. However to back further the current limit (or improve the life time), one may reenforce of a factor 2 to 5 (e.g. 1 to 3 ohm of surface resistance) the metallization edges at the "schooping" area, in the inactive part of the capacitor (margin of the other armature), because that is this region where the current density is the most important. Another advantage of this flat winding shape is to built high voltage capacitors where such elements are stackep up and connected in series within an insulating tube.

For a better understanding of the invention object, we are going to describe now, as a non-exhaustive illustration, the preferred embodiments illustrated by following drawings:

FIG. 1a is the diagram of a capacitor with a dual dielectric.

FIG. 1b shows the equivalent diagram, according to the invention, of the previous capacitor.

FIG. 2 shows an example of the films constitution of the capacitor according to the invention.

Figure 4:
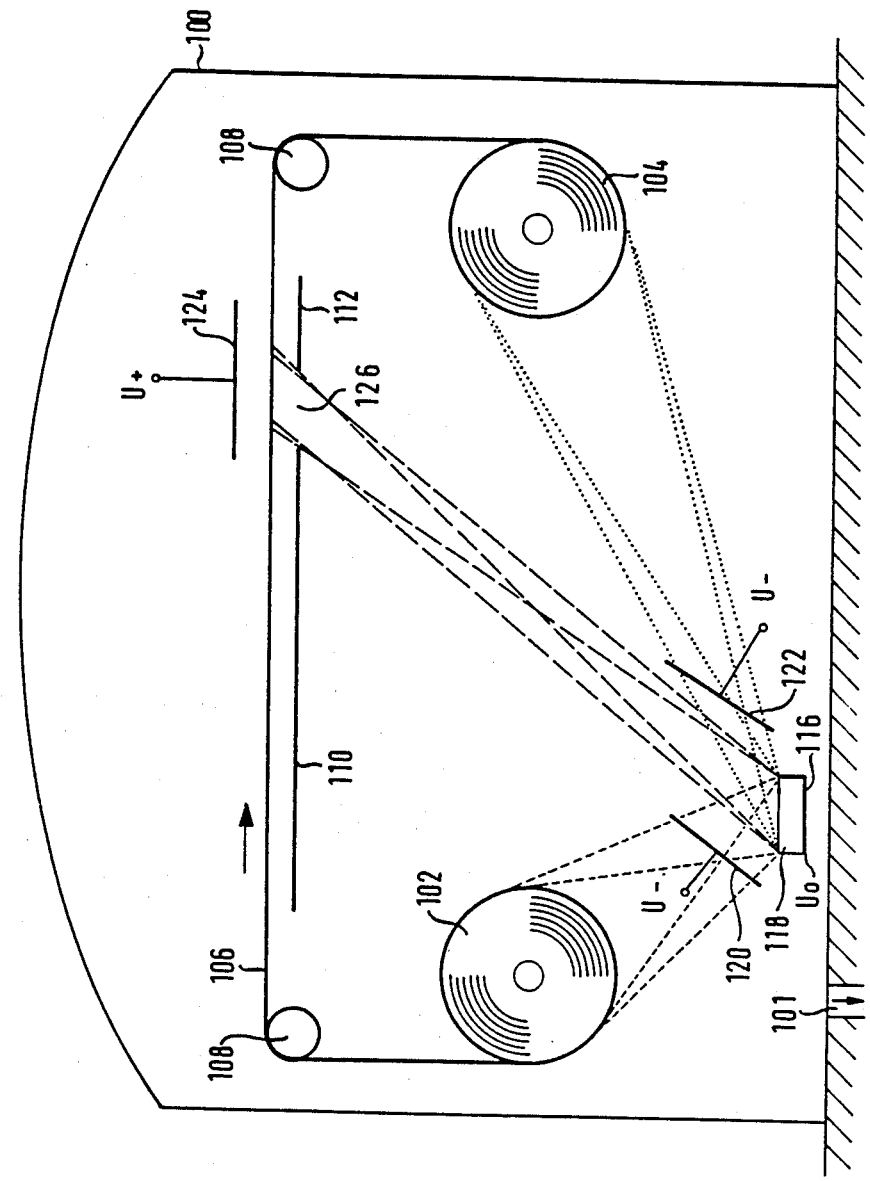

FIGS. 3a and 3b give the shape of the windings according to the invention.

FIG. 4 is the schema of a paper metallization arrangement.

FIG. 5 shows an assembly to press the capacitor paper (side view).

FIG. 6 is a longitudinal section according to line VI—VI of the FIG. 5.

The FIG. 1a is the diagram of a capacitor with a dual dielectric. The two dielectrics 1 and 2 have respectively thickness e1 and e2 and are included between two armatures 3 and 3' to load the capacitor for instance with the respective polarities + and — and to discharge it. The two dielectrics 1 and 2 have respectively relative permittivities $\epsilon_1$ and $\epsilon_2$ and when the capacitor is charged up to its nominal voltage U, the respective electric field strengths are $E_1$ and $E_2$, and the resistivities at these fields are r1 and r2. The voltages which appear at both dielectric ends are $U_1$ and $U_2$.

The FIG. 1b gives the equivalent diagram of the capacitor of the FIG. 1a. This equivalent diagram is not at all conventional. It is characteristic to the invention and gives a preferential method of exploitation of both dielectrics with the same ratio. This preferential method consists in saying that the voltage distribution $U_1$ and $U_2$ at the terminals of the capacitors $C_1$ and $C_2$, which symbolizes the dielectrics 1 and 2, responds to the relation $$\frac{U_2}{U_1} = \frac{R_2}{R_1}$$

FIG. 2 gives an example how the capacitor may be built according to the invention. It shows two multilayer sheets A and B which are absolutely identical. Each multiple layer comprises a paper 5 or 5' provided with a zinc metal layer 4 or 4', and two plastic foils 6(6')

and 7(7') of polyethylen terephthalate. The paper 5(5') provided with the metal layer 4(4') is a so-called metallized paper. The paper 5(5') itself is a varnished paper. The varnish coat consists of cellulose acetate, but cellulose acetobutyrate may also be used. The varnish coat provides a smooth surface and has a thickness of 0.5 μm. The metal layer 4 does not extend up to right-hand lateral edge of the paper 5, but it does extend to and overstep the left-hand edge, even though the metal layer 4' does not reach the paper 5' left-hand edge, but reaches and oversteps the right one. The resulting margins on both sides amounts to about 4 mm. The papers 5, 5' and the plastic foils 6(6') and 7(7') are equal in width. The right and left end faces 8 and 9 in FIG. 2 of the capacitor, formed by rolling up the multiple layers A and B are provided with sprayed-on metal coatings 8 and 9 of zinc which are in contact with the metal coatings 4 and 4' and to which connection wires can be fastened by soldering. For very high currents, it is possible to tin these "schoopings", or to apply other metals on the zinc coatings 8 and 9 instead of these coatings. The metal layer 4,4' has a surface resistance of 7.5 ohm and a thickness of 15 nm (nanometers). Below the zinc coat, there is provided a silver coat of 0.2 to 0.5 nm thickness. The dry paper has a specific insulation resistance of 10,000 Megohm×microfarad (measured at low field strength). Impregnated with silicone oil, it has a specific insulation resistance of about 15,000 Megohm-×microfarad and a maximum or disruptive field strength of about 200 V/μm. The specific insulation resistance of the polyester used is 50,000 Megohm×microfarad and its disruptive field strength is about 600 V/μm. The paper layer 5(5') and the two plastic layers 6(6') and 7(7') have a thickness of 7 μm each. The width of the paper layer and the plastic layers visible in FIG. 2 is 80 mm in the example shown in the drawing, the length which is not visible in the drawing amounts to 100 m. The layers are rolled up on an isolated mandrel 10 with the layers being in close contact to each other and the finished capacitor being connected by coatings 8 and 9 and impregnated by silicone oil, the capacitor roll has a capacitance of 22.5 μF. A self-adhesive polyester tape of about 70 μm thickness wound around the capacitor roll prevents the roll from getting loose unintentionally. During rolling of the capacitor, the foils are stretched at a force of 20 to 25N (Newton).

The dielectric constant of the polyethylene terephthalate is 3.2, the dielectric constant of the paper impregnated with the liquid dielectric is 4.8. The dual dielectric thus formed has alltogether a mean dielectric constant of 4.2.

This elementary capacitor has a rated voltage of 7000 V and, considering its 22.5 μF, a energy level of 551 J. Its volume is of 344 cm³ and its energy density of 1.6 J/μm. Once it is charged to 7000 V, the average electric field strength in the dielectric is of 333 V/cm. It has a L/h value of 1250 and stands discharging currents of about 20000 Amp. Samples of elementary capacitors are regularly retained from the production line and are impregnated to be tested. One measures with the help of an oscilloscope and a recorder, their charging curves up to the rated voltage of 7000 V and further up to a test voltage of 7700 V. If self-curing effects occur, they should be low and disappear during the next charging procedures. Further, one records their discharge curves as described above, and as a third step, one compares the charts to reference charts of a reference elementary capacitor. One analyses the discharge curve and one calculates the time constant and insulation resistances for several points predetermined on the curve, as well as the exploitation percentage of each dielectric. As a normal case, one finds for instance 70 to 80% for each of them. These checks permit the supervising and eventually the correction of the dielectrics quality, and especially the oil quality and impregnation conditions. As a matter of fact, before knowing the principles of equal exploitation of both dielectrics and the influence of the insulation resistances at high field strengths as described in the present invention, it was impossible to obtain reproducibility and series manufacturing of the capacitors reaching the expected field and energy density. We, of course, have obtained a few unique prototypes reaching such specifications, but it has been by mere chance and it has been impossible to meet again these results up to the time we discovered the herein described principles which give us the systematic mastering of the considered parameters. As an indication, the impregnating temperature is of 100° C., the vacuum of $10^{-2}$ to $10^{-3}$ mm Hg and the impregnation time of 24–48 hours. But these conditions are constantly readjusted and may also differ from one model to the other.

The capacitors, for which the manufacturing procedures has been described above, are mostly assigned to be built into cans individually or coupled as batteries. An example of battery consists of two windings of the described type and piled up within an aluminium can of 75 mm diameter and 180 mm height. The windings might be impregnated before or after the conditionning. A preferred technique consists in mounting the non-impregnated but predryed wounds into the can, in crimping the top leaving open the holes for the terminals. These holes will be used for the treatment. The windings inside the can are then dryed again but under vacuum during 48 hours and then impregnated under vacuum for 24 hours. The can will be filled up at the same time. At the end of this procedure and after having broken the vacuum, but without taking out the capacitors from the bath, one even may close the holes by in oil soldering. The obtained capacitor has a capacitance of 45 μF and a rated voltage of 7000 V. It will be used for instance as a discharge capacitor for flash lamps for laser pumping. If the discharge repetition rate is inferior or equal to about 1 Hz, the capacitor will be able to work at its rated voltage or slightly below. If the repetition rate is higher, for instance 20–30 Hz, the capacitor may be used on "derating" mode at a voltage of 2000 to 3000 V. This same elementary capacitor may also be used to built batteries of very high voltage and/or very high energy, by coupling in series or parallel. The voltages may reach several hundreds of KV, and several megajoules. Certain models are suitable to built Marx generators.

A second example consists in an elementary capacitor using the same types and thicknesses of the dielectric, but instead of using a long cylinder like before (FIG. 3a), one realizes a flat one (FIG. 3b) using films of 25 mm width. The rolling height will then reach 25 mm, the wound diameter 74 mm, the volume 107.5 cm³, the capacitance 4.5 μF, the rated voltage 7000 V, the energy 110 J, the energy density 1 J/cm³ and the average field strength 333 V/μm. The length of the films is 100 m and the rates L/h ratio is 4000.

This elementary capacitor permits currents of 5000 to 100,000 A. The energy density of this model is less, compared to the previous one, because the edge proportion, which is substracted twice from the width of the nappe, is more important.

The large interest of this model is its important L/h ratio, its aptitude to high currents, as well as its low height. Indeed, this elementary capacitor is assigned for the confection of batteries by stacking up of these flat cylinders within a tube of 75 mm. So one will have a capacitor of about 50 KV using 8 piled up elements which gives a can height of about 200 mm. Such a capacitor is suitable for gaz lasers. Models of 100 KV are also possible which have as one application the realization of Marx generators. But, as the energy density with a rolling height of 25 mm is lower because of the edge proportions, we also planed some elementary models of capacitors with a height between 25 and 80 mm.

A third application example consists in an elementary capacitor built the same way as the first (FIG. 2 and 3a) but with paper thicknesses of 6 μm (5 and 5') and of 5 μm for each of the layers 6, 6' and 7, 7'. The wound diameter is 49 mm, the volume 150 cm$^3$, the capacitance 15 μF, the rated voltage 5000 V, the energy of 187 J, the energy density of 1.25 J/cm$^3$ and the average field strength of 312.5 V/μm. The film length is 53 m and the L/h ratio is 662. This elementary capacitor permits currents of 10000 A. It can be mounted as a battery, as for the first model, within a can of diameter 50 mm and a height of 180 mm. The obtained capacitor of 30 μF and 5000 V is used, as an example, for cardiological defibrillators at its rated voltage. For other applications like some solid lasers or some photocopiers, it will be able to work either at its nominal voltage, or at a lower one according to the operating conditions. These described elementary capacitors may also be used for batteries of very high voltages or energies.

A fourth capacitor model utilizes the new metallized paper of 4 μm (4,5,4',5') and one polyester film for 6, 7, 6',7'. The nappes of 80 mm width are winded on a two part mandred of 3 mm diameter which is taken off after winding. The wound diameter is of 20 mm, the volume 25 cm$^3$, the capacitance of 12 μF, the rated voltage of 3 KV and the energy of 54 J. The average field strength is of 375 V/μm and the energy density of 2.15 J/cm$^3$. This is a capacitor for an implantable defibrillator. Since that in such an apparatus the capacitor is not in use very frequently and remains loaded only for a very short time, the dielectric may be exploited beyond the limit adopted for industrial applications. So one comes to use the dielectrics at more than 90% of their disruptive strength. So this model, in these conditions, may even exceed the field and the indicated energy density. A fifth and last example utilizes the same dielectric as for the fourth capacitor, but is winded up to a diameter of 74 mm. It has a capacity of 172 μF and a rated voltage of 2.5 KV. Its working voltage may vary between 2 and 3 KV according to the use conditions, which corresponds to an energy density between 1 and 2.25 J/cm$^3$. The applications are various (laser, defibrillators, aso. . . ).

In this last example, one can also exchange the 4 μm paper against fibrils paper of 2.5 μm and take an ethylen polyterephtalate film of 2.5-4 μm. With film widths of 40-80 mm and wound diameter of 15-20 mm, one can built other models for implantable defibrillators with capacitances of 10-30 μF and energy densities between 2-3 J/cm$^3$.

In short, the same dielectrics assemblies may be used at different field strengths and energy densities according to the use conditions and/or to the expected life time:
- 150 to 300 V/μm and 0.4 to 1.2 J/cm$^3$ for filtering, switching, discharge purposes in which the average working power or the life time requirements are high. These capacitor models are also usable below their level (derating) for severe conditions;
- 300 to 400 V/μm and 1.2 to 2 J/cm$^3$ for filtering, switching or discharge purposes for which the working requirements are less hard. (External defibrillators or low repetition rate lasers);
- 400 to 500 V/μm and 2 to 3 J/cm$^3$ for low working rate, for instance implantable defibrillators, max. 500 shocks and almost immediate discharge after the loading process.

Other materials are usable without changing the invention principles:
- other metals or elements are possible for the metallization: aluminium, gold, silver, paladium or pure amorphous carbon;
- other dielectrics are possible in place of dielectric 1: polypropylen, polycarbonate, polysulfone, polystyren, aso. . . ;
- other fibrous structures are possible in place of dielectric 2;
- other impregnation oils in accordance with the invention criteria are possible.

The picture 4 which shows the paper metallization process, represents (out of scale) a vacuum chamber (100) in which we can see the mother reel (102) loaded with capacitor paper and the reception reel on which the paper (106) will be rolled on. The capacitor paper (106) passes along the deviation pulleys and within the upper part of the vacuum chamber (100) is obtured by the diaphragms (110) and (112). A flange (101) connects the chamber to the vacuum pump. In the chamber (100), there is a melting pot in which zinc is brought to evaporation. The electrodes (120) and (122), which are connected to a negative voltage and obturate the starting (102) and reception reel (106), avoid a vapor deposition on themselves. The way which should have taken the vapors in the reel direction if these screens would not exist, is illustrated by dotted lines. Another electrode (124), which has a positiv potential, is located behind the paper (106) behind an aperture in the diaphragm (110, 112). This aperture (126) is so located that the metallic vapors issued from the melting pot and passing through it have an incidence angle of 45° to the paper (106). If necessary, this angle can be changed.

In the example, the distance between the melting pot, made from tantalum, and where the paper (106) is heated by the vapors behind the aperture, is of 15-30 cm. The temperature of the metal is of 400°-800° C. The linear speed of the paper is of 2-4 m/min. The potential difference between $U_o$ of the pot and U+ of the electrode (124) is of 400-800 V.

The electrode (120) and (122) are at a negative potential of −100 V to 200 V against the pot. The pressure in the chamber (100) is of about 10$^{-2}$, and 10$^{-5}$ torr. The metallic deposit on the paper depends on the metal temperature, the incidence angle, the paper speed, the voltages, the pressure within the chamber and the distance melting pot-paper.

The FIGS. 5 and 6 show a diagram of an arrangement which has 3 metallic rollers (200) (202) (204) with the axis in the same plane. The middle roller (200) is driven and transmits the rotation motion by friction to the other rollers. The circumference of the middle roller (200) has a cut out (206) of 85 mm width and 4 μm deep. A commercial capacitor paper ribbon (208), 6 μm thick from the mother reel (210) passes in front of a vapor noozle (212) which moistens it; further it passes between the upper (202) and the middle rollers (200), and further between this middle wheel and the lower one (204). The paper ribbon passes exclusively in the range of the cut out (206). The pressed paper is then rolled on the reception reel (214). Near to the middle roller (200), a second noozle (216) is provided which can be used to vaporize water, varnish or other products, according to the procedure one wants to apply. The noozle (212) impregnates the paper with a relative humidity of 25%–35%. The rollers (200) and (204) are heated up to 80° and 110° C. with the help of infrared heaters. The rollers (200) and (204) have the same diameter, which is 30 cm. The middle roller (200) turns around an axle which is tight to the chassis (222), while the upper (202) and the lower (204) rollers might be moved in the up direction and are pressed against the roller with hydraulic pistons system (224) fed by a hydraulic pump (226). Adjustment devices enable the control of the pressure and so permits to optimize the force with which the rollers are pressed one against the other. In the embodiment, this pressure was of 1000 dN/c$^2$ up to 1500 dN/cm$^2$. The paper has a speed of 8 m/min to 10 m/min. The paper has after the process a thickness of 4 μm to 4.2 μm. The paper, after such a process, has a density of about 1.49 cm$^3$ to 1.5 g/cm$^3$. Paper which is exclusively made of fibrils, has the same density. The disruptive strength of the paper raises up to 400 V/μm if impregnated with silicone oil. It can also be considered to increase the given surface of 2 to 30 Ohms over this value, particularly by using existing paper or new paper and/or the new metallization methods as described above.

In a variation of the invention an electric capacitor is described permitting application to new uses, particularly in those where it must operate at high elevated temperatures, while at the same time, maintaining a sufficient energy storage density.

Capacitors manufactured by superposition, generally by rolling of thin sheets of fibrous materials, generally of impregnated paper and metallized on its faces, are widely used in numerous applications, but suffer from certain limitations; in particular they cannot operate at temperatures higher than about 90° C., which does not permit their use, for example, in ignition systems of airplane reactors, in certain electric circuits at high frequency, and similar applications, where the temperatures can attain values in the range of 200°–250° C.

Other dielectrics have interesting electrical characteristics, particularly a high dielectric constant, for example polyamides ("NYLON") or polytetrafluoroethylene ("TEFLON"), but cannot be used to support metallization, either because they do not have the necessary porosity, when impregnated, or made self-healing, or as they are not suitable for metallization, namely metallization does not "take" on them. The variant of the present invention is based on the discovery that another class of dielectrics has all the requisite requirements for such an application or use, while it is, at the same time, capable of operating at elevated temperatures of the order of 250°–300° C. This is a class of aromatic polyamides, or aramides such as ("KEVLAR") which appear in the form of fibers, and which can be woven so as to constitute fibrous sheets of very low thickness (12.5 microns), and which are capable of being impregnated and metallized so that they can be superimposed for obtaining self-healing capacitors which can be utilized at very high temperatures.

The aramides have been known for many years and have received or been utilized in many applications. They have already been utilized in the form of non-woven fibrous sheets as dielectrics in transformers.

However, they have never been envisioned as support for being metallized for the manufacture of capacitors to the extent that other materials have been preferred for this application, which have a higher dielectric constant, such as polypropylene.

It is therefore for the first time, that the aramides have been put to this application of supporting metallization, and this is due to the simulataneous occurence of five characteristics listed therebelow, which only occur in these materials:

1. A dielectric constanter which is relatively satisfactory;
2. Adaptability for metallization;
3. Apdaptability for impregnation;
4. Adaptability for self-healing at high voltages;
5. Maximal resistance to high temperatures.

No other dielctric material combines these five above-named characteristics, as can be seen from the comparative table below.

| DIELECTRIC | CHARACTERISTICS | | | | |
|---|---|---|---|---|---|
| | εr 50 Hz | 2 | 3 | 4 | 5 |
| Cellulose (paper) | 2.9 | very good | very good | very good | 110° C. |
| Polytetrafluoroethylene (Teflon) | 2 | medium | 0 | poor | 250° C. |
| Polyethylene terephtalates | 3.2 | good | 0 | poor | 130° C. |
| Polycarbonates | 3.8 | good | 0 | poor | 120° C. |
| Aramides (woven) | 2.6 | very good | very good | very good | 250° C. |
| Polypropylene | 2.2 | very good | 0 | good | 105° C. |

It clearly can be ascertained from this table that while cellulose has the most satisfactory characteristics 1–4, it is inconvenient that it can only be operated at moderately high temperatures;

Conversely, TEFLON has an excellent resistance to high temperatures, but does not lend itself at all to impregnation, nor is it "self-healing";

Only the aramides present a sum total of entirely satisfactory characterstics.

Application of capacitors, where the dielectric is constituted or includes aramides, are all those in which a temperature resistance of the order of 250° C. has been researched and found.

For example, it is possible to apply these capacitors to electric circuits at high frequency, which are susceptible of being strongly heated, to nuclear reactors, to ignition circuits for aviation reaction motors, to apparati for magnet-forming in high frequency furnaces and devices, and similar applications.

We claim:

1. An elementary capacitor having an energy density within a range of approximately 0.5 J/cm$^3$ to slightly greater than 2 J/cm$^3$ for energy accumulation, discharge, commutation, and filtering, comprising in combination:

dielectric foil means and two electrically conductive electrodes separated by said dielectric foil means;

said dielectric foil means and said conductive electrodes being rolled up so as to constitute a rolled-up capacitor;

said capacitor being impregnated with a liquid dielectric, and wherein said dielectric foil means includes first and second dielectric foils;

wherein each electrode coacts with said first and second dielectric foil, each electrode being formed by self-curing metallization and having a surface resistance of between 2 and 30 Ohms, and being applied to said second dielectric foil;

said second dielectric foil being made of a woven aramide fibrous support providing a regenerating capacity, and being superimposed upon said first dielectric foil so that said capacitor takes the form of a regenerating capacitor, whereby said capacitor is operative at elevated temperatures up to approximately 250° C.

2. A regenerating capacitor comprising in combination:

first and second metallic foils; and a dielectric, including aramide fibers, providing a regenerating capacity, interposed therebetween, whereby said capacitor is operative at elevated temperatures up to 250° C.

3. An elementary capacitor having an energy density within a range of about 0.5 J/cm$^3$ to slightly greater than 2 J/cm$^3$ for energy accumulation, discharge, commutation and filtering, comprising in combination dielectric foil means and two electrically conductive armatures separated by said dielectric foil means, said dielectric foil means and said conductive armatures being rolled up, so as to constitute a rolled-up capacitor said capacitor having an operating rated voltage in the range of between 0.5 KV and 10 KV and an electric energy accumulation capacity of between 10 J and at least 500 J, and being impregnated with a liquid dielectric, and wherein said dielectric foil means includes first and second dielectric foils, wherein each armature coacts with said first and second dielectric foils, each armature being formed by a metallization, and having a surface resistance of between 2 and 30 Ohms and being applied to said second dielectric foil, said second dielectric foil being made of a fibrous support, providing a regenerating capacity, and being superimposed on said first dielectric foil so that the capacitor takes the form of a regenerating (self-curing) capacitor, each of said first and second dielectric foils having a predetermined thickness and being arranged in a layer so that said first and second dielectric foils separate said conductive armatures, said first and second dielectric foils, said predetermined dielectric foil thickness, and said liquid dielectric being selected so that the ratio between the strength of an electric field associated with the applied operating voltage, and the disruptive strength associated with each of said dielectric foils is substantially equal for each of said first and second dielectric foils at least over a major voltage range within said rated voltage.

4. The capacitor according to claim 3 wherein said first and second dielectric foils and said predetermined dielectric foil thicknesses and said liquid dielectric are selected to ensure that when the operating voltage is applied, an average electric field strength of 200 volts/μm to slightly greater than 400 volts/μm prevails between said armatures.

5. The capacitor according to claim 3 wherein each of said dielectric foils has a resistance, and wherein said first and second dialectric foils, said predetermined dielectric foil thicknesses and said liquid dielectric are selected to ensure that the ratio between the resistance and disruptive strength associated with said first and second dialectric foils, respectively, are substantially equal for a major voltage range within said rated voltage.

6. The capacitor according to claim 3, wherein said rolled up layers are constituted by a plurality of winding turns, wherein said first dielectric foil includes a plastic film, and said fibrous support of said second dielectric foil includes metallized paper, and wherein said rolled-up capacitor has lateral faces covered with conductive coats establishing a connection to respective of said armatures.

7. The capacitor according to claim 6, wherein said dielectric foils define a combined thickness, and wherein said paper has a thickness of at least 6 μm constituting 30% to 45% of said combined thickness, and wherein said energy density at said rated voltage is at least 1 J/cm$^3$.

8. The capacitor according to claim 6, wherein said dielectric foils define a combined thickness, and wherein said paper has a thickness constituting 45% to 60% of said combined thickness, and wherein said energy density at said rated voltage is at least 0.85 J/cm$^3$.

9. The capacitor according to claim 6, wherein said dielectric foils define a combined thickness, and wherein said paper has a thickness less than 6 μm constituting 10% to 50% of said combined thickness, and wherein said energy density at said rated voltage is at least 1 J/cm$^3$.

10. The capacitor according to claim 6, wherein said connection is located in a non-active area, said metallization having a thickness in said non-active area exceeding the thickness thereof in remaining and active areas thereof.

11. The capacitor according to claim 3, wherein said second dielectric foil includes cellulose.

12. The capacitor according to claim 3, wherein said second dielectric foil includes a cellulose derivative.

13. The capacitor according to claim 3, wherein said second dielectric has a thickness less than 6 μm.

14. The capacitor according to claim 3, wherein said liquid dielectric includes silicone oil.

15. The capacitor according to claim 3, wherein said metallization has a surface resistance in the range from 5 Ohms to 10 Ohms.

16. The capacitor according to claim 3, wherein energy is consumed during regeneration (self-curing), said regeneration energy being less than 10% of the energy stored in said capacitor.

17. The capacitor according to claim 16, wherein said regeneration energy is less than 1% of the energy stored in said capacitor.

18. The capacitor according to claim 3, further comprising: at least another capacitor similar to the first-named capacitor, said other capacitor being connected in series with said first-named capacitor so as to constitute a battery of capacitors.

19. The capacitor according to claim 3, further comprising at least another capacitor similar to the first-named capacitor, said other capacitor being connected in parallel with said first-named capacitor so as to constitute a battery of capacitors.

20. An elementary capacitor having an energy density within a range of about 0.5 J/cm$^3$ to slightly greater than 2 J/cm$^3$ for energy accumulation, discharge, commutation and filtering, comprising in combination
   dielectric foil means and two electrically conductive armatures separated by said dielectric foil means,
   said dielectric foil means and said conductive armatures being rolled up so as to constitute a rolled-up capacitor;
   said capacitor having an operating rated voltage in the range of between 0.5 KV and 10 KV and an electric energy accumulation capacity of between 10 J and at least 500 J, and being impregnated with a liquid dielelectric, and wherein said dielectric foil means includes first and second dielectric foils,
   wherein each armature coacts with said first and second dielectric foils, each armature being formed by a metallization, and having a surface resistance of between 2 and 30 Ohms and being applied to said second dielectric foil,
   said second dielectric foil being made of a fibrous support, providing a regenerating capacity, and being superimposed on said first dielectric foil so that the capacitor takes the form of a regenerating (self-curing) capacitor,
   each of said first and second dielectric foils having a predetermined thickness and being arranged in a layer so that said first and second dielectric foils separate said conductive armatures,
   said first and second dielectric foils, said predetermined dielectric foil thicknesses and said liquid dielectric being selected so that the ratio between the strength of an electric field associated with the applied operating voltage, and the disruptive strength associated with each of said dielectric foils is substantially equal for each of said first and second dielectric foils at least over a major voltage range within said rated voltage,
   wherein said rolled up conductive armatures are constituted by a plurality of winding turns, wherein said first dielectric foil includes a plastic film, and said fibrous support of said second dielectric foil includes metallized paper, and wherein said wound-up capacitor has lateral faces covered with conductive coats establishing a connection to respective of said armatures.

21. The capacitor according to claim 20, wherein each of said armatures has a predetermined length and width, and wherein the ratio of said length to said width is in the range of 500 to 1000, and wherein said capacitor can deliver a peak current between 500 and 20,000 Amperes.

22. The capacitor according to claim 20, wherein each of said armatures has a predetermined length and width, and wherein the ratio of said length to said width is in the range of 1000 to 5000, and wherein said capacitor can deliver a peak current between 5000 and 100,000 Amperes.

23. A capacitor having an energy density within a range of about 0.5 J/cm$^3$ to slightly greater than 2 J/cm$^3$ for energy accumulation, discharge, commutation and filtering, comprising in combination
   dielectric foil means and two electrically conductive armatures separated by said dielectric foil means,
   said discharge capacitor having an operating rated voltage in the range of between 8 KV and 20 KV and an electric energy accumulation capacity of between 10 J and 500 J, and being impregnated with a liquid dielelectric, and wherein said dielectric foil means includes first and second dielectric foils,
   wherein each armature coacts with said first and second dielectric foils, respectively, each armature being formed by a metallization, and having a surface resistance of between 2 and 30 Ohms and being applied to said second dielectric foil,
   said second dielectric foil being made of a fibrous support, providing a regenerating capacity, and being superimposed on said first dielectric foil so that the capacitor takes the form of a regenerating (self-curing) capacitor,
   each of said first and second dielectric foils having a predetermined thickness and being arranged so that at least two layers of said first dielectric foil with a layer of said second dielectric foil interposed between said at least two layers of said first dielectric foil separate said conductive armatures,
   all of said layers and armatures being wound up, and the so obtained rolled-up capacitor being covered on lateral faces thereof with conductive coats establishing an electrical connection to respective of said armatures,
   said first and second dielectrics, said predetermined dielectric foil thicknesses, and said liquid dielectric being selected so that the ratio between the strength of an electric field associated with the applied operating voltage, and the disruptive strength associated with each of said dielectric foils is substantially equal for each of said first and second dielectric foils at least over a major voltage range within said rated voltage.

* * * * *